US010895875B2

(12) United States Patent
Hashimoto et al.

(10) Patent No.: US 10,895,875 B2
(45) Date of Patent: Jan. 19, 2021

(54) AUTONOMOUS DRIVING SYSTEM (71) Applicants: Toyota Jidosha Kabushiki Kaisha, Toyota (JP); Denso Corporation, Kariya (JP)

(72) Inventors: Ryuta Hashimoto, Susono (JP); Kenichiro Aoki, Miyoshi (JP); Yoshinori Watanabe, Isehara (JP); Daisuke Satoh, Kariya (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 326 days.

(21) Appl. No.: 15/806,801

(22) Filed: Nov. 8, 2017

(65) Prior Publication Data

US 2018/0150074 A1 May 31, 2018

(30) Foreign Application Priority Data

Nov. 30, 2016 (JP) ................ 2016-232563

(51) Int. Cl.
G05D 1/00 (2006.01)
B60K 28/02 (2006.01)
G05D 1/02 (2020.01)
B60W 40/08 (2012.01)

(52) U.S. Cl.
CPC .......... *G05D 1/0061* (2013.01); *B60K 28/02* (2013.01); *G05D 1/021* (2013.01); *B60K 2370/175* (2019.05); *B60W 2040/0872* (2013.01); *B60W 2540/10* (2013.01); *B60W 2540/12* (2013.01);

(Continued)

(58) Field of Classification Search
CPC ...... G05D 1/0061; G05D 1/021; B60K 28/02; B60K 2370/175; B60W 2040/0872; B60W 2540/12; B60W 2540/10; B60W 2540/18; B60W 2540/22
See application file for complete search history.

(56) References Cited

U.S. PATENT DOCUMENTS

| 8,670,891 | B1 | 3/2014 | Szybalski et al. |
| 2014/0088814 | A1 | 3/2014 | You et al. |
| 2015/0088358 | A1 | 3/2015 | Yopp |

(Continued)

FOREIGN PATENT DOCUMENTS

| EP | 3045996 A1 | 7/2016 |
| JP | H10329575 A | 12/1998 |

(Continued)

*Primary Examiner* — Nga X Nguyen
(74) *Attorney, Agent, or Firm* — Dinsmore & Shohl LLP (57) ABSTRACT An autonomous driving system includes: a driver information acquisition device that acquires driver information indicating an action and a state of a driver of a vehicle; and a control device that performs autonomous driving control that controls autonomous driving of the vehicle. The autonomous driving control includes: deactivating action detection processing that detects, based on the driver information, a deactivating action of the driver to deactivate the autonomous driving; ready state detection processing that detects, based on the driver information, a ready state indicating that the driver is ready for manual driving; and deactivation processing that deactivates the autonomous driving when the ready state is detected after the deactivating action is detected.

14 Claims, 8 Drawing Sheets

(52) U.S. Cl.
CPC ..... *B60W 2540/18* (2013.01); *B60W 2540/22* (2013.01)

(56) References Cited

U.S. PATENT DOCUMENTS

| | | |
|---|---|---|
| 2015/0120124 A1 | 4/2015 | Bartels et al. |
| 2016/0207537 A1 | 7/2016 | Urano et al. |
| 2016/0207538 A1 | 7/2016 | Urano et al. |
| 2016/0209840 A1 | 7/2016 | Kim |
| 2018/0157256 A1 | 6/2018 | Oniwa et al. |
| 2019/0155279 A1* | 5/2019 | Tayama ................ B60W 50/14 |
| 2019/0232966 A1* | 8/2019 | Prakah-Asante ..... B60W 40/08 |

FOREIGN PATENT DOCUMENTS

| | | |
|---|---|---|
| JP | 2009-214680 A | 9/2009 |
| JP | 2014-065478 A | 4/2014 |
| JP | 2015-147547 A | 8/2015 |
| JP | 2016-132352 A | 7/2016 |
| JP | 2016-133984 A | 7/2016 |
| JP | 2016-151815 A | 8/2016 |
| WO | 2016181725 A1 | 11/2016 |

* cited by examiner

AUTONOMOUS DRIVING SYSTEM

CROSS-REFERENCE TO RELATED APPLICATIONS

This application claims priority to Japanese Patent Application No. 2016-232563 filed on Nov. 30, 2016, which is incorporated herein by reference in its entirety including the specification, drawings, and abstract.

BACKGROUND

Technical Field

The present disclosure relates to an autonomous driving system of a vehicle. In particular, the present disclosure relates to a control technique at a time of deactivating autonomous driving.

Background Art

Patent Literature 1 discloses an autonomous driving system of a vehicle. During autonomous driving, the autonomous driving system monitors a driver's operation of a steering wheel, a brake pedal, or an accelerator pedal. When an amount of the operation exceeds a threshold value, the autonomous driving system deactivates the autonomous driving control and returns vehicle control to the driver.

LIST OF RELATED ART

Patent Literature 1: U.S. Pat. No. 8,670,891

SUMMARY

Let us consider a case where a driver performs an operation for deactivating autonomous driving during the autonomous driving of a vehicle. According to the technique disclosed in Patent Literature 1 mentioned above, when such the operation is detected, the autonomous driving is immediately deactivated. In this case, the autonomous driving is deactivated even if the driver is not ready for manual driving. Thus, there is a possibility that the vehicle continues to travel while neither the driver nor the autonomous driving system engages in vehicle driving. Moreover, the driver feels rushed under pressure to start the manual driving as soon as possible, which makes the driver feel psychological pressure and a sense of unease. These destroy the driver's sense of ease at the time of deactivating the autonomous driving.

An object of the present disclosure is to provide an autonomous driving technique where the driver can deactivate the autonomous driving without worry.

A first aspect of the present disclosure provides an autonomous driving system.

The autonomous driving system includes:

a driver information acquisition device configured to acquire driver information indicating an action and a state of a driver of a vehicle; and a control device configured to perform autonomous driving control that controls autonomous driving of the vehicle.

The autonomous driving control includes:

deactivating action detection processing that detects, based on the driver information, a deactivating action of the driver to deactivate the autonomous driving;

ready state detection processing that detects, based on the driver information, a ready state indicating that the driver is ready for manual driving; and deactivation processing that deactivates the autonomous driving when the ready state is detected after the deactivating action is detected.

A second aspect of the present disclosure further has the following features in addition to the first aspect of the present disclosure.

The ready state is that the driver is holding a steering wheel.

A third aspect of the present disclosure further has the following features in addition to the first aspect of the present disclosure.

The ready state is that a steering torque, a steering amount, or a steering speed of a steering operation by the driver is greater than a threshold value.

A fourth aspect of the present disclosure further has the following features in addition to the first aspect of the present disclosure.

The ready state is that the driver is performing at least one of a steering operation, an acceleration operation, and a braking operation.

A fifth aspect of the present disclosure further has the following features in addition to the first aspect of the present disclosure.

The deactivating action is that the driver performs at least one of a steering operation, an acceleration operation, and a braking operation.

The ready state is that the driver is performing a same operation as the deactivating action again.

A sixth aspect of the present disclosure further has the following features in addition to the first aspect of the present disclosure.

The deactivating action is that the driver performs at least one of a steering operation, an acceleration operation, and a braking operation with a first operation amount or more.

The ready state is that the driver is performing a same operation as the deactivating action with a second operation amount or more, the second operation amount being larger than the first operation amount.

A seventh aspect of the present disclosure further has the following features in addition to the first aspect of the present disclosure.

In the ready state detection processing, the control device calculates, based on the driver information, a level of attentiveness of the driver with respect to a front direction.

The ready state is that the level of attentiveness is greater than a reference value.

An eighth aspect of the present disclosure further has the following features in addition to any one of the first to seventh aspect of the present disclosure.

The autonomous driving control includes steering control, acceleration control, and deceleration control.

During a period from detection of the deactivating action until detection of the ready state, the control device performs deactivation standby control that continues at least one of the steering control, the acceleration control, and the deceleration control.

A ninth aspect of the present disclosure further has the following features in addition to the eighth aspect of the present disclosure.

In the deactivation standby control, the control device continues at least the steering control.

A tenth aspect of the present disclosure further has the following features in addition to the eighth or ninth aspect of the present disclosure.

In the deactivation standby control, the control device terminates the acceleration control.

The autonomous driving system according to the present disclosure does not deactivate the autonomous driving just by detecting the deactivating action of the driver. The autonomous driving system deactivates the autonomous driving only after detecting the ready state after the detection of the deactivating action. That is, the autonomous driving system waits until the driver becomes ready for the manual driving after the detection of the deactivating action of the driver. Therefore, it is possible to obviate such a situation that the vehicle continues to travel while neither the driver nor the autonomous driving system engages in vehicle driving. Moreover, the driver need not feel rushed under pressure to start the manual driving as soon as possible after the deactivating action. These relieve psychological pressure applied to the driver and the driver's sense of unease. As a result, according to the present disclosure, the driver can deactivate the autonomous driving without worry.

EMBODIMENTS

Embodiments of the present disclosure will be described below with reference to the attached drawings.

1. Outline

Figure 1:
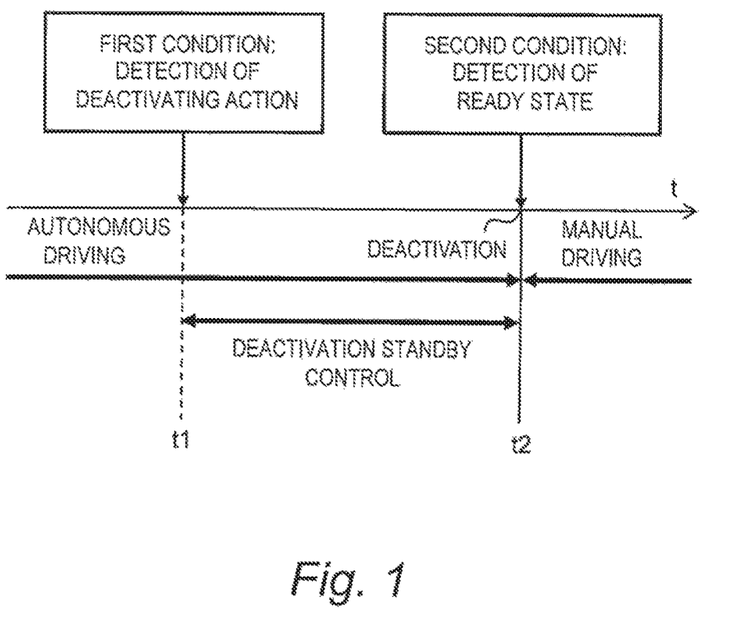
FIG. 1 is a conceptual diagram for explaining an outline of an autonomous driving system according to an embodiment of the present disclosure.

FIG. 1 is a conceptual diagram for explaining an outline of an autonomous driving system according the present embodiment. In particular, a feature when the autonomous driving system deactivates autonomous driving of a vehicle will be described. According to the present embodiment, two conditions (triggers) are required for deactivating the autonomous driving.

A first condition is to detect a "deactivating action". Here, the deactivating action is an action performed by a driver of the vehicle to deactivate the autonomous driving. It can be said that the deactivating action reflects the driver's intention of deactivating the autonomous driving. For example, the deactivating action is that "the driver turns OFF an autonomous driving switch".

A content of the deactivating action is predetermined and registered on the autonomous driving system. While executing the autonomous driving control, the autonomous driving system determines whether or not the driver performs the deactivating action. In other words, the autonomous driving system performs detection of the deactivating action during the autonomous driving. It should be noted that types of the deactivating action registered on the autonomous driving system can be plural. In that case, detecting the deactivating action means detecting at least one of the plural types of the deactivating action.

In the example shown in FIG. 1, the autonomous driving system detects the deactivating action at a time t1. However, the autonomous driving system according to the present embodiment does not immediately deactivate the autonomous driving even when the deactivating action is detected. Even if the first condition is satisfied, the autonomous driving system continues the autonomous driving until a second condition is satisfied.

The second condition is to detect a "ready state". Here, the ready state is a state indicating that the driver is ready for manual driving. It can be said that the ready state indicates that shift from the autonomous driving to the manual driving can be performed safely. For example, the ready state is that "the driver is holding a steering wheel".

A content of the ready state is predetermined and registered on the autonomous driving system. After the deactivating action is detected, the autonomous driving system checks whether or not the driver is in the ready state. In other words, the autonomous driving system performs detection of the ready state. It should be noted that types of the ready state registered on the autonomous driving system can be plural. In that case, detecting the ready state means detecting at least one of the plural types of the ready state.

In the example shown in FIG. 1, the autonomous driving system detects the ready state at a time t2. In response to the detection of the ready state, the autonomous driving system deactivates the autonomous driving. Then, the manual driving by the driver starts.

In a period from the time t11 to the time t2, the autonomous driving system performs "deactivation standby control". In the deactivation standby control, the autonomous driving system continues at least a part of control related to the autonomous driving. More specifically, the control related to the autonomous driving includes steering control, acceleration control, and deceleration control. In the deactivation standby control, the autonomous driving system continues at least one of the steering control, the acceleration control, and the deceleration control.

As described above, the autonomous driving system according to the present embodiment does not deactivate the autonomous driving just by detecting the deactivating action of the driver. The autonomous driving system deactivates the autonomous driving only after detecting the ready state after the detection of the deactivating action. That is, the autonomous driving system waits until the driver becomes ready for the manual driving after the detection of the deactivating action of the driver. Therefore, it is possible to obviate such a situation that the vehicle continues to travel while neither the driver nor the autonomous driving system engages in vehicle driving. Moreover, the driver need not feel rushed under pressure to start the manual driving as soon as possible after the deactivating action. These relieve psychological pressure applied to the driver and the driver's sense of unease.

As a result, according to the present embodiment, the driver can deactivate the autonomous driving without worry. This contributes to increase in the driver's confidence in the autonomous driving system. That is to say, it becomes easier for the driver to utilize the autonomous driving system.

Hereinafter, the autonomous driving system according to the present embodiment will be described in more detail.

2. Configuration Example of Autonomous Driving System

Figure 2:
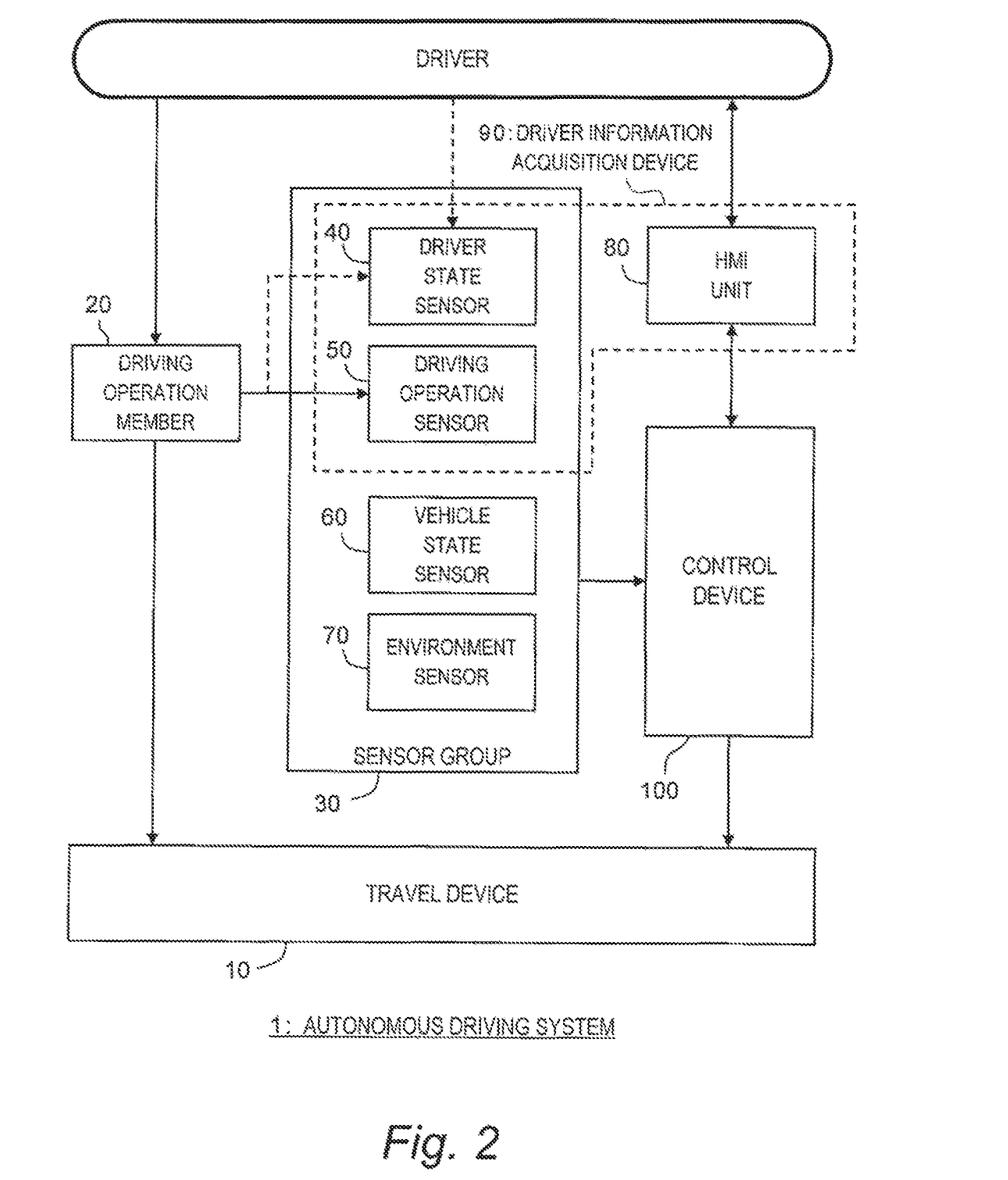
FIG. 2 is a block diagram showing a configuration example of the autonomous driving system according to the embodiment of the present disclosure.

FIG. 2 is a block diagram showing a configuration example of the autonomous driving system 1 according to the present embodiment. The autonomous driving system 1 is mounted on the vehicle and controls the autonomous driving of the vehicle. More specifically, the autonomous driving system 1 is provided with a travel device 10, a driving operation member 20, a sensor group 30, an HMI unit 80, and a control device 100.

2-1. Travel Device 10

The travel device 10 includes a steering device, a driving device, a braking device, a transmission, and so forth. The steering device turns wheels. The driving device is a power source that generates a driving force. The driving device is exemplified by an engine and an electric motor. The braking device generates a braking force.

2-2. Driving Operation Member 20

The driving operation member 20 is a member that the driver operates when manually driving the vehicle. The driver can control the travel device 10 by operating the driving operation member 20. More specifically, the driving operation member 20 includes a steering wheel, an accelerator pedal, a brake pedal, a shift lever, and so forth. The steering wheel is operated for turning the wheel through the steering device. The accelerator pedal is operated for controlling the driving device. The brake pedal is operated for controlling the braking device. The shift lever (select lever) is operated for selecting a gear of the transmission.

2-3. Sensor Group 30

The sensor group 30 is provided for detecting a variety of information. More specifically, the sensor group 30 includes a driver state sensor 40, a driving operation sensor 50, a vehicle state sensor 60, and an environment sensor 70.

<Driver State Sensor 40>

Figure 3:
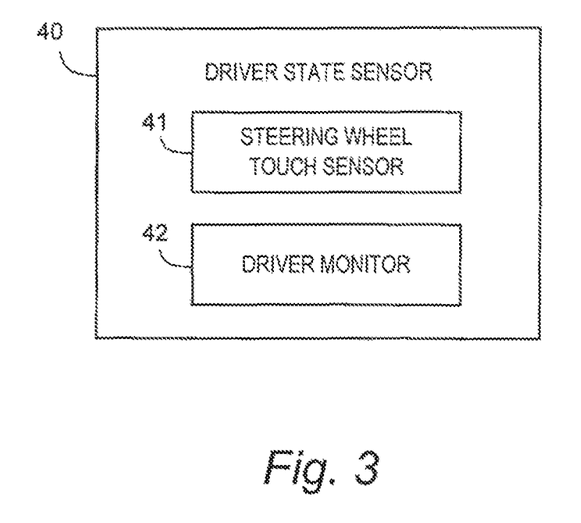
FIG. 3 is a block diagram showing a configuration example of a driver state sensor in the autonomous driving system according to the embodiment of the present disclosure.

The driver state sensor 40 is a sensor for detecting a state of the driver. FIG. 3 is a block diagram showing a configuration example of the driver state sensor 40. The driver state sensor 40 includes a steering wheel touch sensor 41 and a driver monitor 42.

The steering wheel touch sensor 41 is provided for detecting whether or not the driver is holding the steering wheel. More specifically, the steering wheel touch sensor 41 is installed at a section of the steering wheel to be held by the driver. The steering wheel touch sensor 41 is capable of detecting whether or not a hand of the driver is touching the steering wheel, a touched position, a touch pressure, and the like. The steering wheel touch sensor 41 sends the detected information to the control device 100.

The driver monitor 42 detects a state of the driver through imaging. More specifically, the driver monitor includes an imaging device such as an infrared camera. The imaging device is installed at a position (e.g. on a steering wheel column cover) where it can image a face of the driver. The driver monitor 42 is capable of detecting various kinds of the state of the driver by analyzing an image obtained by the imaging device. For example, the driver monitor 42 can detect an orientation of the face, a direction of eyes, and an eye opening/closing degree of the driver. The driver monitor 42 sends the detected information to the control device 100.

<Driving Operation Sensor 50>

Figure 4:
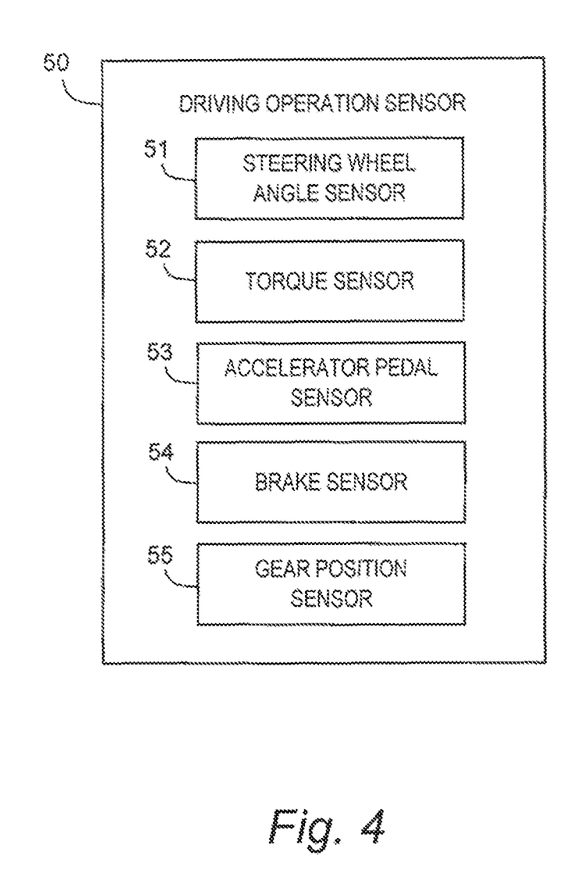
FIG. 4 is a block diagram showing a configuration example of a driving operation sensor in the autonomous driving system according to the embodiment of the present disclosure.

The driving operation sensor 50 is a sensor for detecting an operation of the driving operation member 20 by the driver. FIG. 4 is a block diagram showing a configuration example of the driving operation sensor 50. The driving operation sensor 50 includes a steering wheel angle sensor 51, a torque sensor 52, an accelerator pedal sensor 53, a brake sensor 54, and a gear position sensor 55.

The steering wheel angle sensor 51 detects a steering angle of the steering wheel. The torque sensor 52 detects a steering torque at the time of steering. The accelerator pedal sensor 53 detects a stroke amount of the accelerator pedal. The brake sensor 54 detects a stroke amount of the brake pedal. The gear position sensor 55 detects a position of the shift lever. Each sensor sends the detected information to the control device 100.

<Vehicle State Sensor 60>

The vehicle state sensor 60 is a sensor for detecting a state of the vehicle. For example, the vehicle state sensor 60 includes a GPS (Global Positioning System) device, a vehicle speed sensor, and so forth. The GPS device receives signals transmitted from a plurality of GPS satellites and calculates a position and a posture (orientation) of the vehicle based on the received signals. The vehicle speed sensor detects a speed of the vehicle. The vehicle state sensor 60 sends the detected information to the control device 100.

<Environment Sensor 70>

The environment sensor 70 is a sensor for detecting an environment (situation) around the vehicle. Such the environment sensor 70 is exemplified by a LIDAR (Laser Imaging Detection and Ranging), a millimeter-wave radar, a stereo camera, and so forth. For example, the environment sensor 70 detects a moving target and a stationary target around the vehicle. The moving target is exemplified by a surrounding vehicle and a pedestrian. Information on the moving target includes a position and a speed of the moving target. The stationary target is exemplified by a roadside structure, a white line, and a road sign. Information of the stationary target includes a position of the stationary target. The environment sensor 70 sends the detected information to the control device 100.

2-4. HMI Unit 80

Figure 5:
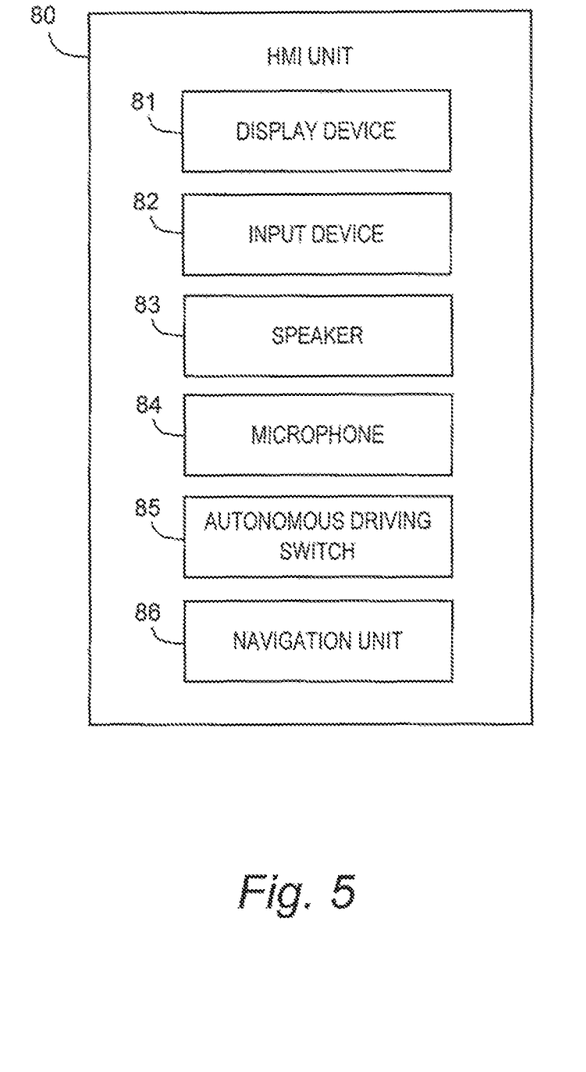
FIG. 5 is a block diagram showing a configuration example of an HMI unit in the autonomous driving system according to the embodiment of the present disclosure.

The HMI (Human Machine Interface) unit 80 is a device for proving the driver with information and receiving information and instructions from the driver. FIG. 5 is a block diagram showing a configuration example of the HMI unit 80. The HMI unit 80 includes a display device 81, an input device 82, a speaker 83, a microphone 84, an autonomous driving switch 85, and a navigation unit 86.

The display device 81 displays a variety of information. The display device 81 is exemplified by a liquid crystal display and a touch panel. The input device 82 is used by the driver for inputting information or an instruction. The input device 82 is exemplified by a button, a switch, and a touch panel. The speaker 83 outputs voice information. The microphone 84 is used for inputting voice information. For example, the microphone 84 detects voice of the driver. The driver can give information and an instruction to the control device 100 through the input device 82 and the microphone 84. The control device 100 can provide the driver with a variety of information through the display device 81 and the speaker 83.

The autonomous driving switch 85 is a switch used for instructing ON/OFF of the autonomous driving. The autonomous driving switch 85 may be a part of the input device 82. An ON/OFF operation of the autonomous driving switch 85 by the driver is transmitted to the control device 100. By turning ON the autonomous driving switch 85, the driver can instruct the control device 100 to activate the autonomous driving. By turning OFF the autonomous driving switch 85, the driver can instruct the control device 100 to deactivate the autonomous driving.

The navigation unit 86 manages navigation information. The navigation information includes a map, a current position of the vehicle, a destination, a route to the destination, and so forth. The navigation unit 86 displays the navigation information on the display device 81. Moreover, the navigation unit 86 receives setting or change of the destination from the driver through the input device 82. Moreover, the navigation unit 86 provides the driver with a variety of information through the display device 81 and the speaker 83. The navigation unit 86 shares the navigation information with the control device 100.

2-5. Driver Information Acquisition Device 90

The driver state sensor 40 (see FIG. 3), the driving operation sensor 50 (see FIG. 4), and the HMI unit 80 (see FIG. 5) described above constitute a driver information acquisition device 90. The driver information acquisition device 90 acquires "driver information" indicating the action and the state of the driver.

More specifically, the driver information includes the state of the driver detected by the driver state sensor 40. Moreover, the driver information includes the action of the driver (i.e. the operation of the driving operation member 20) detected by the driving operation sensor 50. Furthermore, the driver information includes an input action of the driver using the HMI unit 80. The input action includes an operation of the input device 82, utterance detected by the microphone 84, the ON/OFF operation of the autonomous driving switch 85, an operation of setting and change of the destination with respect to the navigation unit 86, and the like.

2-6. Control Device 100

The control device 100 performs the "autonomous driving control" that controls the autonomous driving of the vehicle. Typically, the control device 100 is a microcomputer including a processor, a memory, and an input/output interface. The control device 100 is also called an ECU (Electronic Control Unit). The control device 100 receives the detected information from the sensor group 30 and communicates information with the HMI unit 80 through the input/output interface. The control device 100 performs the autonomous driving control based on the received information. For example, the control device 100 creates a travel plan of the vehicle and controls the travel device 10 so that the vehicle travels according to the travel plan.

It should be noted that the contents of the "deactivating action" and the "ready state", which are explained in FIG. 1, are recorded on the memory of the control device 100. The control device 100 is able to detect the deactivating action and the ready state based on the driver information acquired by the driver information acquisition device 90.

Hereinafter, the autonomous driving control by the control device 100 will be described in more detail.

3. Functional Configuration of Control Device 100

Figure 6:
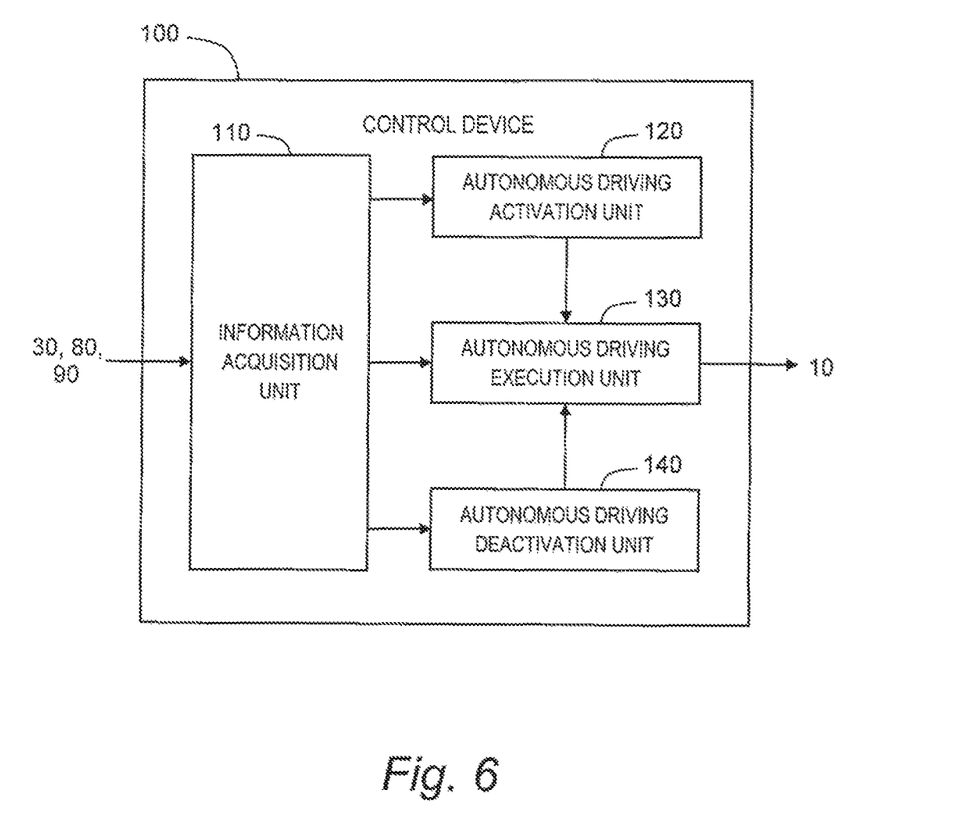
FIG. 6 is a block diagram showing a functional configuration example of a control device in the autonomous driving system according to the embodiment of the present disclosure.

FIG. 6 is a block diagram showing a functional configuration example of the control device 100 according to the present embodiment. The control device 100 includes an information acquisition unit 110, an autonomous driving activation unit 120, an autonomous driving execution unit 130, and an autonomous driving deactivation unit 140 as functional blocks related to the autonomous driving control. These functional blocks are achieved by the processor of the control device 100 executing a control program stored in the memory. The control program may be recorded on a computer-readable recording medium.

3-1. Information Acquisition Unit 110

The information acquisition unit 110 acquires the detected information from the sensor group 30. In addition, the information acquisition unit 110 acquires the information and instructions input to the HMI unit 80 by the driver. In particular, the information acquisition unit 110 acquires the above-described driver information from the driver information acquisition device 90. It should be noted that the information acquisition unit 110 repeatedly executes this information acquisition processing every certain cycle.

3-2. Autonomous Driving Activation Unit 120

The autonomous driving activation unit 120 determines whether or not to activate the autonomous driving control. More specifically, the autonomous driving activation unit 120 receives the driver information from the information acquisition unit 110. Then, the autonomous driving activation unit 120 determines, based on the received driver information, whether a activation condition is satisfied or not. For example, the activation condition is that "the autonomous driving switch 85 is turned ON". If the activation condition is satisfied, the autonomous driving activation unit 120 determines to activate the autonomous driving control and instructs the autonomous driving execution unit 130 to execute the autonomous driving control.

3-3. Autonomous Driving Execution Unit 130

The autonomous driving execution unit 130 executes the autonomous driving control. More specifically, the autonomous driving execution unit 130 receives the information acquired by the information acquisition unit 110. Based on the received information, the autonomous driving execution unit 130 creates a travel plan of the vehicle and controls the travel device 10 so that the vehicle travels according to the travel plan.

For example, the autonomous driving execution unit 130 determines a travel plan including a travel route, a lane change point and the like, based on the current position of the vehicle, the destination, the map data and the like. As another example, the autonomous driving execution unit 130 may detect an obstacle (e.g. a low-speed vehicle, a fallen object) in front of the vehicle, based on the detected information from the environment sensor 70. In this case, the autonomous driving execution unit 130 determines a travel plan including an avoidance behavior for avoiding the obstacle. Then, the autonomous driving execution unit 130 controls the travel device 10 so that the vehicle travels according to the travel plan. The control of the travel device 10 includes the steering control for controlling the steering device, the acceleration control for controlling the driving device, and the deceleration control for controlling the braking device.

3-4. Autonomous Driving Deactivation Unit 140

The autonomous driving deactivation unit 140 determines whether or not to deactivate the autonomous driving control. More specifically, the autonomous driving deactivation unit 140 receives the driver information from the information acquisition unit 110. Then, the autonomous driving deactivation unit 140 determines, based on the received driver information, whether a deactivation condition is satisfied or not. The deactivation condition includes the first condition and the second condition described in FIG. 1. If the deactivation condition is satisfied, the autonomous driving deactivation unit 140 determines to deactivate the autonomous driving control and instructs the autonomous driving execution unit 130 to terminate execution of the autonomous driving control.

Hereinafter, autonomous driving deactivation processing by the autonomous driving deactivation unit 140 according to the present embodiment will be described in more detail.

4. Autonomous Driving Deactivation Processing

Figure 7:
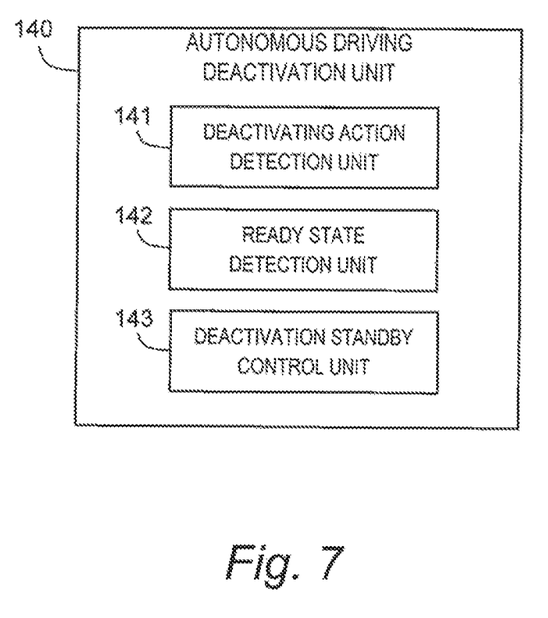
FIG. 7 is a block diagram showing a functional configuration example of an autonomous driving deactivation unit in the autonomous driving system according to the embodiment of the present disclosure.

FIG. 7 is a block diagram showing a functional configuration example of the autonomous driving deactivation unit 140 according to the present embodiment. The autonomous driving deactivation unit 140 includes a deactivating action detection unit 141, a ready state detection unit 142, and a deactivation standby control unit 143.

Figure 8:
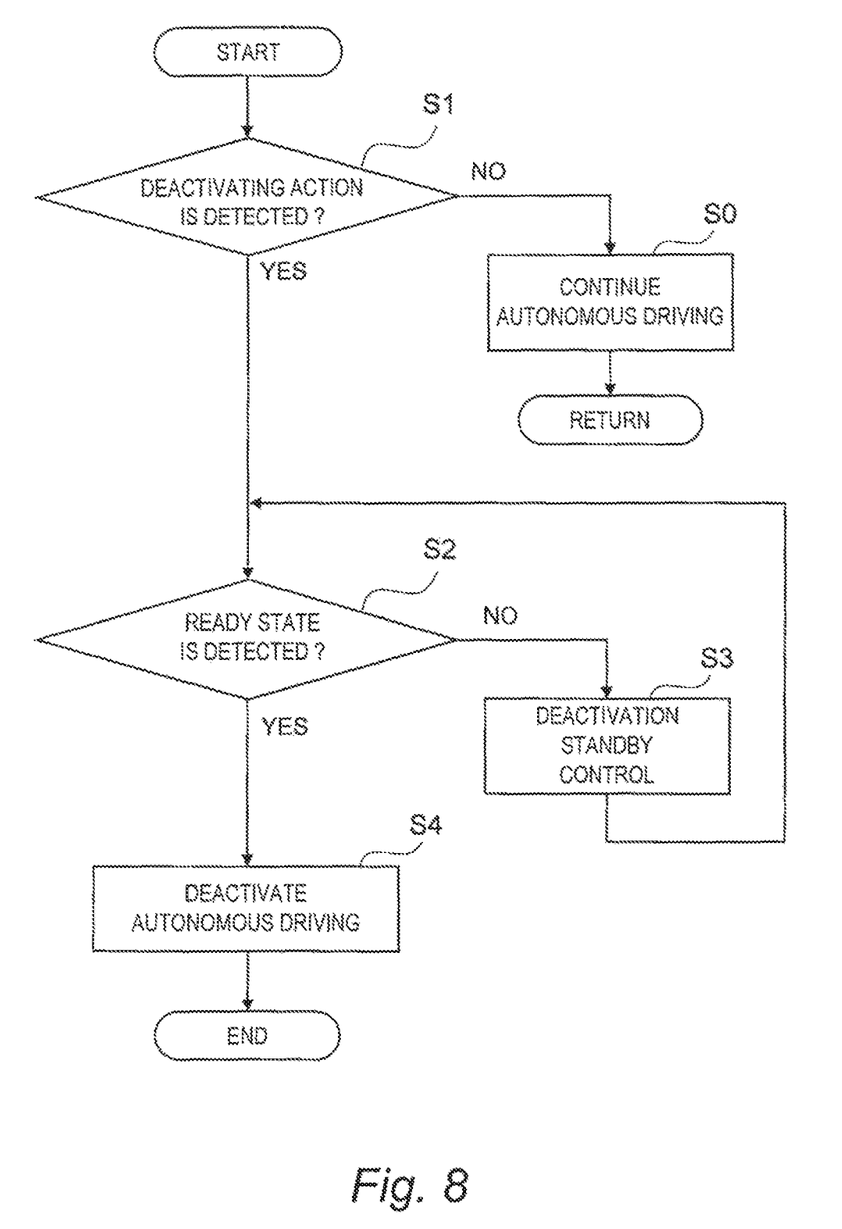
FIG. 8 is a flow chart showing autonomous driving deactivation processing by the autonomous driving system according to the present disclosure.

FIG. 8 is a flow chart showing the autonomous driving deactivation processing by the autonomous driving deactivation unit 140. The autonomous driving deactivation processing is performed when the autonomous driving control is in execution.

4-1. Step S1: Deactivating Action Detection Processing

The deactivating action detection unit 141 performs deactivating action detection processing that detects the "deactivating action" based on the driver information. The deactivating action detection processing corresponds to determining whether the first condition described in FIG. 1 is satisfied or not. The deactivating action is an action of the driver to deactivate the autonomous driving. A content of the deactivating action is predetermined and registered on the memory of the control device 100. Types of the deactivating action registered can be plural. In that case, detecting the deactivating action means detecting at least one of the plural types of the deactivating action. Examples of the deactivating action are as follows.

A first example is that the driver turns OFF the autonomous driving switch 85 (see FIG. 5).

A second example is that the driver performs a braking operation. The braking operation by the driver can be detected through the brake sensor 54 (see FIG. 4). More specifically, the brake sensor 54 detects a stroke amount of the brake pedal due to the braking operation. For example, when the stroke amount of the brake pedal exceeds a threshold value, the deactivating action detection unit 141 judges that the braking operation is performed.

A third example is that the driver performs an acceleration operation. The acceleration operation by the driver can be detected through the accelerator pedal sensor 53 (see FIG. 4). More specifically, the accelerator pedal sensor 53 detects a stroke amount of the accelerator pedal due to the acceleration operation. For example, when the stroke amount of the accelerator pedal exceeds a threshold value, the deactivating action detection unit 141 judges that the acceleration operation is performed.

A fourth example is that the driver performs a steering operation. The steering operation by the driver can be detected through the steering wheel angle sensor 51 or the torque sensor 52 (see FIG. 4). More specifically, a steering amount and a steering speed of the steering operation can be calculated from the steering angle of the steering wheel detected by the steering wheel angle sensor 51. A steering torque of the steering operation can be detected by the torque sensor 52. For example, when the steering amount, the steering speed, or the steering torque exceeds a threshold value, the deactivating action detection unit 141 judges that the steering operation is performed.

A fifth example is that the driver sets the position of the shift lever to "P (PARKING)". If the position of the shift lever becomes "P", it is required to deactivate the autonomous driving for safety reasons. The position of the shift lever can be detected by the gear position sensor 55 (see FIG. 4).

A sixth example is that the driver utters a specific phrase. The utterance by the driver can be detected through the microphone 84 (see FIG. 5). The specific phrase is exemplified by "deactivate autonomous driving" and the like. By analyzing the voice information detected by the microphone 84, the deactivating action detection unit 141 can detect that the driver utters the specific phrase.

A seventh example is that the driver changes or deletes the setting of the destination. The change or deletion of the setting of the destination can be detected through the navigation unit 86 (see FIG. 5).

If the deactivating action detection unit 141 does not detect the deactivating action (Step S1; No), the autonomous driving continues (Step S0). On the other hand, if the deactivating action detection unit 141 detects the deactivating action (Step S1; Yes), it means that the first condition is satisfied. In this case, the processing proceeds to Step S2.

4-2. Step S2: Ready State Detection Processing

The ready state detection unit 142 performs ready state detection processing that detects the "ready state" based on the driver information. The ready state detection processing corresponds to determining whether the second condition described in FIG. 1 is satisfied or not. The ready state is a state indicating that the driver is ready for the manual driving. The content of the ready state is predetermined and registered on the memory of the control device 100. Types of the ready state registered can be plural. In that case, detecting the ready state means detecting at least one of the plural types of the ready state. Examples of the ready state are as follows.

A first example is that the driver is holding the steering wheel. Whether or not the driver is holding the steering wheel can be determined by a well-known method based on the detected information from the steering wheel touch sensor 41 (see FIG. 3). The fact that the driver is holding the steering wheel suggests strongly that the driver is conscious of driving and ready for the manual driving.

A second example is that the driver is performing a steering operation. The steering operation by the driver can be detected through the steering wheel angle sensor 51 or the torque sensor 52 (see FIG. 4). More specifically, a steering amount and a steering speed of the steering operation can be calculated from the steering angle of the steering wheel detected by the steering wheel angle sensor 51. A steering torque of the steering operation can be detected by the torque sensor 52. For example, when the steering amount, the steering speed, or the steering torque is greater than a threshold value, the ready state detection unit 142 judges that the driver is performing the steering operation. The fact that the steering amount, the steering speed, or the steering torque is greater than the threshold value suggests that a hand of the driver does not accidentally touch the steering wheel but the driver is actively operating the steering wheel. That is, it strongly suggests that the driver is conscious of driving and ready for the manual driving.

A third example is that the driver is performing an acceleration operation. The acceleration operation by the driver can be detected through the accelerator pedal sensor 53 (see FIG. 4). More specifically, the accelerator pedal sensor 53 detects a stroke amount of the accelerator pedal due to the acceleration operation. For example, when the stroke amount of the accelerator pedal is greater than a threshold value, the ready state detection unit 142 judges that the driver is performing the acceleration operation. The fact that the stroke amount of the accelerator pedal is greater than the threshold value suggests that a foot of the driver does not accidentally touch the accelerator pedal but the driver is actively operating the accelerator pedal. That is, it strongly suggests that the driver is conscious of driving and ready for the manual driving.

A fourth example is that the driver is performing a braking operation. The braking operation by the driver can be detected through the brake sensor 54 (see FIG. 4). More specifically, the brake sensor 54 detects a stroke amount of the brake pedal due to the braking operation. For example, when the stroke amount of the brake pedal is greater than a threshold value, the ready state detection unit 142 judges that the driver is performing the braking operation. The fact that the stroke amount of the brake pedal is greater than the threshold value suggests that a foot of the driver does not accidentally touch the brake pedal but the driver is actively operating the brake pedal. That is, it strongly suggests that the driver is conscious of driving and ready for the manual driving.

A fifth example is applied to a case where the deactivating action in Step S1 described above is one of the steering operation, the acceleration operation, and the braking operation. More specifically, the fifth example is that the driver is performing the same operation as the deactivating action again. For example, the driver steps on the brake pedal as the deactivating action and then steps on the brake pedal again. Thereby, it is judged that the driver becomes the ready state. In the case of the present example, the operation required for the driver to deactivate the autonomous driving is simplified.

A sixth example also is applied to a case where the deactivating action in Step S1 described above is one of the steering operation, the acceleration operation, and the braking operation. Specifically, the sixth example is that the driver is performing the same operation as the deactivating action more strongly than the deactivating action. More specifically, the deactivating action is that the driver performs one of the steering operation, the acceleration operation, and the braking operation with a first operation amount or more. The ready state is that the driver is performing the same operation as the deactivating action with a second operation amount or more. Here, the second operation amount is larger than the first operation amount. For example, the driver steps on the brake pedal as the deactivating action and then further depresses the brake pedal. Thereby, it is judged that the driver becomes the ready state. In the case of the present example, the operation required for the driver to deactivate the autonomous driving is simplified.

A seventh example is that a level of attentiveness of the driver with respect to a front direction is greater than a reference value. The level of attentiveness can be calculated based on the detected information from the driver monitor 42 (see FIG. 3). For example, the ready state detection unit 142 holds a map indicating a relationship between an input parameter and the level of attentiveness. For example, the input parameter includes the orientation of the face and the eye opening/closing degree of the driver detected by the driver monitor 42. The map is created such that the level of attentiveness becomes higher as an angle between the orientation of the face and the front direction becomes smaller. Moreover, the map is creased such that the level of attentiveness becomes higher as the eye opening degree becomes larger. The ready state detection unit 142 can calculate the level of attentiveness based on the map and the detected information from the driver monitor 42. The fact that the level of attentiveness is high suggests strongly that the driver is conscious of driving and ready for the manual driving.

An eighth example is that the driver utters a specific phrase. The utterance by the driver can be detected through the microphone 84 (see FIG. 5). The specific phrase is exemplified by "OK", "ready", and the like. By analyzing the voice information detected by the microphone 84, the ready state detection unit 142 can detect that the driver utters the specific phrase. The fact that the driver actively utters such the specific phrase suggests strongly that the driver is now ready.

A ninth example is that a waiting time T has elapsed after the deactivating action is detected in the above-described Step S1. For example, the waiting time T is set to a certain period of time (several seconds, for example). When the certain period of time has elapsed after the deactivating action of the driver is detected, it is expected that the driver is ready. Alternatively, the waiting time T may be variably set depending on a surrounding situation at the time when the deactivating action is detected. For example, if a preceding vehicle detected by the environment sensor 70 exists nearby, the waiting time T is set to be longer. As a result, the autonomous driving control continues for a longer time and thus collision with the preceding vehicle can be avoided at least by the autonomous driving control.

If the ready state detection unit 142 does not detect the ready state (Step S2; No), the processing proceeds to Step S3. On the other hand, if the ready state detection unit 142 detects the ready state (Step S2; Yes), it means that the second condition is satisfied. In this case, the processing proceeds to Step S4.

4-3. Step S3: Deactivation Standby Control

The deactivation standby control unit 143 performs the deactivation standby control that continues at least a part of the autonomous driving control. The above-described Step S2 (i.e. the ready state detection processing) is executed repeatedly during the deactivation standby control. The deactivation standby control is performed until the ready state is detected at Step S2. In the example shown in FIG. 1, the deactivation standby control is performed during a period from the time t1 when the deactivating action is detected to the time t2 when the ready state is detected.

In the deactivation standby control, the deactivation standby control unit 143 continues at least one of the steering control, the acceleration control, and the deceleration control included in the autonomous driving control. The control to be continued is hereinafter referred to as "continued control". Control other than the continued control is hereinafter referred to as "non-continued control". The deactivation standby control unit 143 sends information designating the continued control and the non-continued control to the autonomous driving execution unit 130. The autonomous driving execution unit 130 continues the continued control and terminates the non-continued control. The followings can be considered as examples of a combination of the continued control and the non-continued control.

In a first example, the combination of the continued control and the non-continued control is predetermined. For example, the steering control is most important in terms of safety. Therefore, at least the steering control is classified into the continued control. On the other hand, even if the acceleration control is terminated, there is no particular problem in terms of safety. Therefore, the acceleration control is classified into the non-continued control.

In a second example, the combination of the continued control and the non-continued control is determined depending on a type of the deactivating action. For example, in a case where the deactivating action is the braking operation or the acceleration operation, it is understood that the driver intends to generate a longitudinal force. Therefore, in that case, the acceleration control and the deceleration control are set as the non-continued control, and only the steering control is set as the continued control. In a case where the deactivating action is neither the braking operation nor the acceleration operation, only the acceleration control is set as the non-continued control, and the steering control and the deceleration control are set as the continued control.

Alternatively, when emphasizing the safety further, the following combination also is possible. That is, even when the deactivating action is the braking operation or the acceleration operation, only the acceleration control is set as the non-continued control, and the steering control and the deceleration control are set as the continued control. When the deactivating action is to turn OFF the autonomous driving switch 85, all controls are set as the continued control.

In a third example, the combination of the continued control and the non-continued control is determined depending on the state of the driver. The state of the driver is detected by the driver state sensor 40. For example, whether or not the driver is holding the steering wheel can be determined based on the detected information from the steering wheel touch sensor 41. When the driver is not holing the steering wheel, at least the steering control is set as the continued control.

In a fourth example, the combination of the continued control and the non-continued control is determined depending on a situation around the vehicle. The situation around the vehicle is detected by the environment sensor 70. For example, when a distance between the vehicle and a preceding vehicle is less than a threshold value, at least the deceleration control is set as the continued control, assuming that it may take time for the driver to be ready. Moreover, the situation around the vehicle can be obtained also from the map data. For example, when a distance to a curve start point ahead is less than a threshold value, at least the steering control is set as the continued control, assuming that it may take time for the driver to be ready.

By terminating the non-continued control during the deactivation standby control before deactivating the autonomous driving, it is possible to gradually shift from the autonomous driving to the manual driving. In other words, it is possible to suppress rapid change in the vehicle behavior at the time of the shift from the autonomous driving to the manual driving. As a result, the driver's feeling of strangeness is reduced.

When terminating the non-continued control, a control amount regarding the non-continued control may be gradually decreased. This also contributes to suppression of rapid change in the vehicle behavior. In this case, a decrease property (e.g. a decrease period, a decrease rate) of the control amount can be determined depending on a situation around the vehicle. The situation around the vehicle is detected by the environment sensor 70. For example, when a lateral distance to a lateral vehicle traveling in an adjacent lane is less than a threshold value, the decrease period of the control amount may be set to be longer than a default value.

During the period of the deactivation standby control, the deactivation standby control unit 143 may provide the driver with notification through the display device 81 and the speaker 83 of the HMI unit 80. The followings can be considered as the example of the notification:

(1) notification to urge the driver to prepare for the manual driving (e.g. "Please prepare for manual driving");

(2) notification to instruct the content of the ready state (e.g. "Please hold steering wheel");

(3) notification to warn of termination of a part of the autonomous driving control; and (4) notification to teach the continued control and the non-continued control.

4-4. Step S4

The autonomous driving deactivation unit 140 instructs the autonomous driving execution unit 130 to deactivate the autonomous driving. In response to the instruction, the autonomous driving execution unit 130 deactivates the autonomous driving. At this time, the control amount regarding the autonomous driving control may be gradually decreased, as in the case of Step S3 described above.

5. Effects

As described above, the autonomous driving system 1 according to the present embodiment does not deactivate the autonomous driving just by detecting the deactivating action of the driver. The autonomous driving system 1 deactivates the autonomous driving only after detecting the ready state after the detection of the deactivating action. That is, the autonomous driving system 1 waits until the driver becomes ready for the manual driving after the detection of the deactivating action of the driver. Therefore, it is possible to obviate such a situation that the vehicle continues to travel while neither the driver nor the autonomous driving system 1 engages in vehicle driving. Moreover, the driver need not feel rushed under pressure to start the manual driving as soon as possible after the deactivating action. These relieve psychological pressure applied to the driver and the driver's sense of unease.

As a result, according to the present embodiment, the driver can deactivate the autonomous driving without worry. This contributes to increase in the driver's confidence in the autonomous driving system 1. That is to say, it becomes easier for the driver to utilize the autonomous driving system 1.

What is claimed is:

1. An autonomous driving system comprising:
a driver information acquisition device configured to acquire driver information indicating an action and a state of a driver of a vehicle; and
a control device configured to perform autonomous driving control that controls autonomous driving of the vehicle,
wherein the control device is further configured to execute:
deactivating action detection processing that determines, based on the driver information, whether or not a deactivating action of the driver to deactivate the autonomous driving is detected during execution of the autonomous driving control;
ready state detection processing that determines, based on the driver information, whether or not a ready state indicating that the driver is ready for manual driving is detected after the deactivating action is detected;
deactivation standby control that repeatedly executes the ready state detection processing while continuing at least part of the autonomous driving control, until the ready state is detected after the deactivating action is detected; and
deactivation processing that deactivates the autonomous driving when the ready state is detected after the deactivating action is detected,
the autonomous driving control includes at least one of steering control, acceleration control, and deceleration control, and in the deactivation standby control, the control device continues a first control among the steering control, the acceleration control, and the deceleration control included in the autonomous driving control while a second control other than the first control included in the autonomous driving control is terminated.

2. The autonomous driving system according to claim 1, wherein the ready state is that the driver is holding a steering wheel.

3. The autonomous driving system according to claim 1, wherein the ready state is that a steering torque, a steering amount, or a steering speed of a steering operation by the driver is greater than a threshold value.

4. The autonomous driving system according to claim 1, wherein the ready state is that the driver is performing at least one of a steering operation, an acceleration operation, and a braking operation.

5. The autonomous driving system according to claim 1, wherein the deactivating action is that the driver performs at least one of a steering operation, an acceleration operation, and a braking operation, and wherein the ready state is that the driver is performing a same operation as the deactivating action again.

6. The autonomous driving system according to claim 1, wherein the deactivating action is that the driver performs at least one of a steering operation, an acceleration operation, and a braking operation with a first operation amount or more, and wherein the ready state is that the driver is performing a same operation as the deactivating action with a second operation amount or more, the second operation amount being larger than the first operation amount.

7. The autonomous driving system according to claim 1, wherein in the ready state detection processing, the control device calculates, based on the driver information, a level of attentiveness of the driver with respect to a front direction, and wherein the ready state is that the level of attentiveness is greater than a reference value.

8. The autonomous driving system according to claim 1, wherein the first control includes at least the steering control.

9. The autonomous driving system according to claim 1, wherein the second control includes the acceleration control.

10. The autonomous driving system according to claim 1, wherein
in the deactivation standby control, the control device determines a combination of the first control and the second control according to a type of the deactivating action.

11. The autonomous driving system according to claim 1, wherein
in the deactivation standby control, the control device determines a combination of the first control and the second control according to a state of the driver.

12. The autonomous driving system according to claim 1, wherein
in the deactivation standby control, the control device determines a combination of the first control and the second control according to a situation around the vehicle.

13. The autonomous driving system according to claim 1, wherein
in the deactivation standby control, the control device repeatedly executes the ready state detection processing without executing the deactivating action detection processing.

14. The autonomous driving system according to claim 1, wherein
the control device is further configured to classify the autonomous driving control including the steering control, the acceleration control, and the deceleration control into the first control and the second control.

* * * * *

UNITED STATES PATENT AND TRADEMARK OFFICE
CERTIFICATE OF CORRECTION

PATENT NO. : 10,895,875 B2
APPLICATION NO. : 15/806801
DATED : January 19, 2021
INVENTOR(S) : Ryuta Hashimoto et al.

Page 1 of 1

It is certified that error appears in the above-identified patent and that said Letters Patent is hereby corrected as shown below:

In the Specification

Column 4, Line 45, delete "t11" and insert --t1--, therefor.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*